Figure 1:
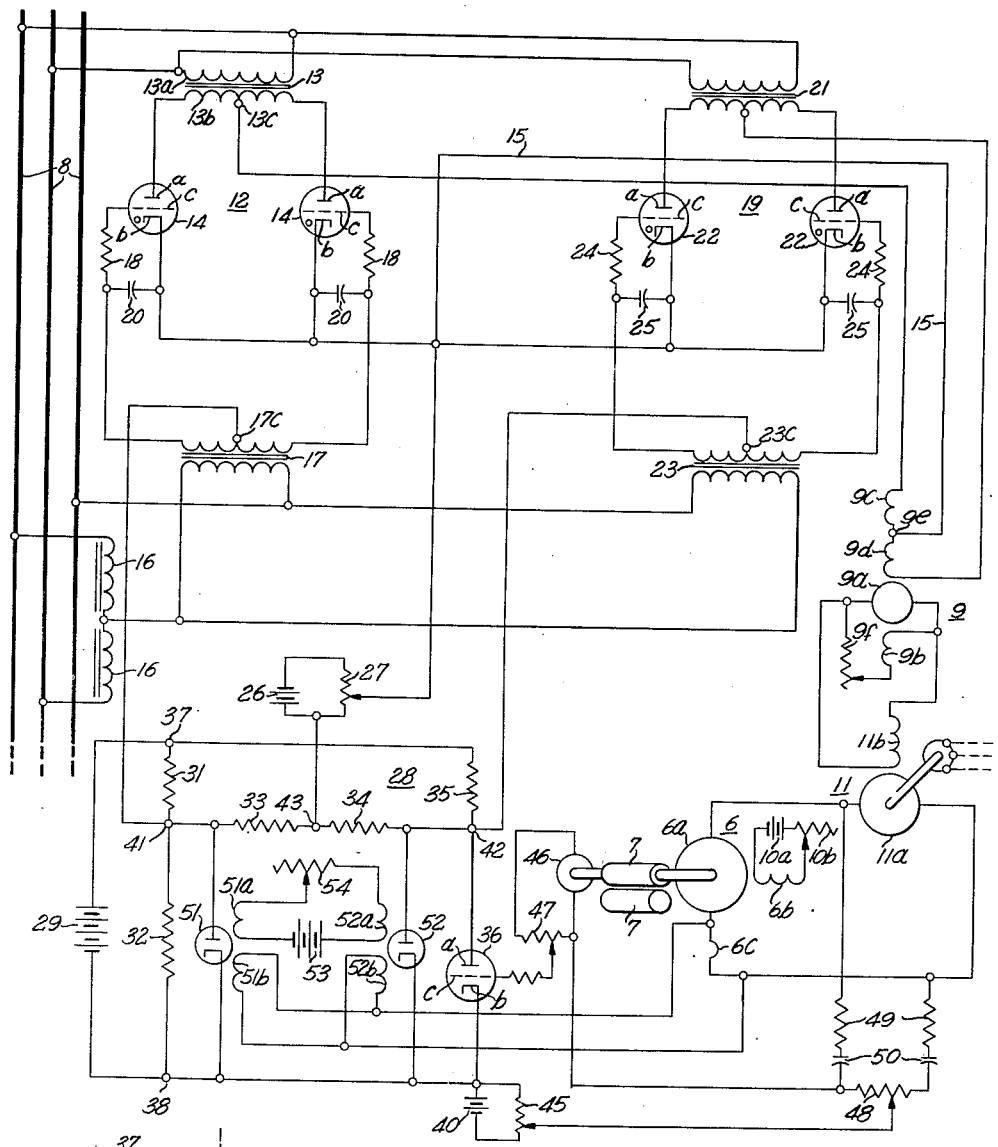

April 22, 1952  A. C. HALTER  2,594,015
CONTROL SYSTEM FOR DYNAMOELECTRIC MACHINE UTILIZING
A MAGNETICALLY CONTROLLED ELECTRIC VALVE
Filed Nov. 28, 1950

Inventor
Allan C. Halter
by Walter J. Madden Jr.
Attorney

Patented Apr. 22, 1952

2,594,015

UNITED STATES PATENT OFFICE 2,594,015

CONTROL SYSTEM FOR DYNAMOELECTRIC MACHINE UTILIZING A MAGNETICALLY CONTROLLED ELECTRIC VALVE

Allan C. Halter, Milwaukee, Wis., assignor to Allis-Chalmers Manufacturing Company, Milwaukee, Wis.

Application November 28, 1950, Serial No. 197,949

7 Claims. (Cl. 318—143)

This invention relates in general to improvements in electric control systems and in particular to means for controlling a dynamoelectric machine to limit the magnitude of an operating condition thereof.

Dynamoelectric machine control systems are known in which a regulator which is normally operative to maintain constant an operating condition of the machine, such as voltage, current, speed or power, is overcome by the action of protective means responsive to another operating condition of the machine attaining a limiting value. Some of such systems utilize a triode which is biased to cut off during normal operation of the regulating means and which is rendered conductive upon the operating condition reaching the limiting value to overcome the regulating means and prevent the other operating condition from substantially exceeding the limiting value. However, the change from nonconductivity to conductivity of a triode is a gradual process requiring a substantial change in grid bias with respect to the bias which just renders the tube conductive to produce a substantial plate current in the tube. Therefore, these systems suffer from the disadvantage that although the protective triode is rendered conductive upon the operating condition attaining a limiting value, the operating condition may substantially exceed its limiting value before the triode is rendered conductive enough to pass sufficient plate current to overcome the regulating means.

These disadvantages can be overcome by utilizing as protecting means a device which is rendered abruptly fully responsive to an operating condition of a dynamoelectric machine tending to exceed a limiting or critical value. One of the most suitable of such devices is a magnetically controlled vacuum tube which is energized by a measure of the condition to be limited and which has the property of becoming abruptly conductive or nonconductive in response to small variations in the strength of the magnetic field around the tube. A magnetically controlled tube has the further advantage of permitting electrical isolation of the regulating and control circuits from the regulated machine.

It is therefore an object of the present invention to provide a control system for a dynamoelectric machine provided with regulating means for maintaining one operating condition of the machine constant, in which system the operation of the regulating means is abruptly overcome in response to another operating condition of the machine attaining a critical limiting value.

It is a further object of the present invention to provide protective means for a dynamoelectric machine control system in which the protective means and regulating system are electrically isolated from the machine.

Figure 2:
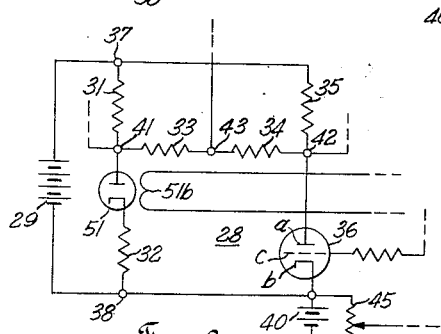

Objects and advantages other than those set forth above will be readily apparent from the following description when read in connection with the accompanying drawing, in which:

Fig. 1 diagrammatically illustrates one embodiment of the invention applied to the control of a variable speed dynamoelectric machine, and Fig. 2 partly illustrates an alternate embodiment of the invention illustrated in Fig. 1.

Referring more particularly to the drawing by character of reference, numeral 6 designates a dynamoelectric machine of which an operating condition is to be regulated. Machine 6 is provided with an armature 6a, and a field winding 6b energized from any suitable source such as a battery 10a through an adjustable resistor 10b. Machine 6 may be a motor of any suitable type, such as a direct current motor driving any suitable load device such as the rolls 7 of one stand of a paper mill. Machine 6 is energized from an alternating current circuit 8 through suitable rectifying means, the output of the rectifying means being amplified by an exciter 9 and a generator 11. The armature 6a of machine 6 is connected to armature winding 11a of generator 11, and field winding 11b is connected to the armature winding 9a of exciter 9. Exciter 9 is provided with a self exciting field winding 9b connected in series with an adjustable resistor 9f, and a pair of differentially acting field windings 9c, 9d provided with a common terminal 9e. Winding 9c may be energized from circuit 8 through a rectifier of any suitable known type generally designated 12.

Rectifier 12 may comprise a transformer 13 having a primary winding 13a connected to circuit 8 and having a secondary winding 13b provided with a midtap 13c connected to one of the terminals of field winding 9c. The terminals of winding 13b are connected to the anodes 14a of a pair of electric valves 14 having their cathodes 14b connected to terminal 9e through a conductor 15. Valves 14 are preferably of the thyratron type provided with control grids 14c, but may also be of the ignitron or other suitable type. Grids 14c may be impressed with different potential components including an alternating component of suitable phase and magnitude obtained from circuit 8 through a phase shifting circuit comprising reactors 16, a grid transformer 17 and a pair of current limiting resistors 18.

Field winding 9d may likewise be energized from circuit 8 through a second rectifier 19 comprising a transformer 21 and a pair of thyratrons 22 having their cathodes 22b connected with terminal 9e through conductor 15. Grids 22c may be impressed with different potential components including an alternating component identical to that of grids 14c obtained from circuit 8 through reactors 16, a second grid transformer 23 and a pair of current limiting resistors 24. Thyratrons 14 may be provided with filter capacitors 20 connected between cathodes 14b and resistors 18; and thyratrons 22 may be provided with similarly connected capacitors 25.

A common variable unidirectional potential component may be impressed simultaneously on grids 14c, 22c from any suitable source of direct current conventionally represented by a battery 26, through a voltage divider 27 provided with an adjustable tap connected to cathodes 14b, 22b. To cause rectifiers 12, 19 to selectively supply oppositely acting variable current to windings 9c, 9d, common means are provided for simultaneously varying the unidirectional potential component of grids 14c, 22c in opposite senses. Such potential variation is effected by means of a bridge circuit generally designated 28 energized from any suitable source of direct current of substantially constant voltage such as a battery 29.

The bridge circuit comprises five constant resistors 31 to 35 and an electric valve of any suitable type, such as a triode 36, serving as a variable element. The bridge elements define a pair of input terminals 37, 38 connected to battery 29, a pair of output terminals 41, 42 and a neutral terminal 43 intermediate the output terminals. Terminal 41 is connected with grids 14c through a connection joining terminal 41 with the secondary midpoint 17c of transformer 17. Likewise, terminal 42 is connected with grids 22c through a connection joining terminal 42 to the secondary midpoint 23c of transformer 23. Terminal 43 is connected to cathodes 14b, 22b through voltage divider 27. The potential difference between terminals 41, 42 may be varied in response to an operating condition of the system, by means connected with cathode 36b of triode 36 for impressing a variable control potential on grid 36c thereof.

The control potential comprises an adjustable constant component obtained from a source of constant unidirectional voltage such as an adjustable voltage divider 45 connected across a battery 40. The control potential further comprises a variable unidirectional component responsive to the operating condition of machine 6 to be controlled. If it is desired to control the speed of machine 6, regulating means comprising a tachometer generator 46 driven by machine 6 may be provided to impress across an adjustable voltage divider 47 a voltage proportional to the speed of machine 6. Voltage divider 47 is serially connected with voltage divider 45 between cathode 36b and grid 36c. The connections between voltage dividers 45, 47 include an adjustable resistor 48 energized from generator 11 through a damping network comprising resistors 49 and capacitors 50 to form an antihunting element responsive to the rate of change of the voltage of generator 11.

To prevent an operating condition of machine 6 other than the condition being regulated from substantially exceeding a limiting value, protective means are provided in the form of a pair of magnetically controlled diodes 51, 52 associated with the regulating means. In the embodiment illustrated, diode 51 is connected across the bridge arm containing resistor 32, while diode 52 is connected across the cathode and anode of triode 36. Diodes 51, 52 each have associated therewith a magnetic bias coil 51a, 52a, respectively, and a magnetic control coil 51b, 52b, respectively.

Bias coils 51a, 52a are energized from a suitable direct current source, such as a battery 53, through an adjustable resistor 54, while control coils 51b, 52b are energized by a measure of the operating condition which it is desired to limit. If, for instance, it is desired to prevent the current in armature 6a from exceeding a predetermined critical value, control coils 51b, 52b may be connected across an interpole winding 6c of motor 6 to be thereby energized by a measure of the current in armature 6a. Diodes 51, 52 have the property that for values of net magnetomotive force acting on a diode above a predetermined value, no current flows through the tube, and that when the net magnetomotive force is reduced slightly below the predetermined value, the diode becomes substantially fully conductive. Thus, tubes 51, 52 are rendered abruptly conductive or nonconductive in response to small changes in the net magnetomotive force acting on the diode.

In operation, with circuit 8 energized and machines 9 and 11 running, machine 6 operates at a speed dependent upon the voltage of armature 11a resulting from the excitation of field winding 11b, which excitation is in turn determined by the voltage of armature 9a. Assuming that machine 6 is operating at the desired speed, tachometer generator 46 impresses upon voltage divider 47 a voltage proportional to the speed of machine 6. Grid 36c is impressed with the resultant of oppositely directed potentials from voltage dividers 45, 47 to maintain triode 36 in a predetermined state of conductivity. Assuming that resistor 9f is adjusted so that self exciting field winding 9b provides only a portion of the excitation for exciter 9, bridge 28 is caused to have a predetermined degree of unbalance which results in terminal 42 becoming positive with respect to terminal 43 and in terminal 41 becoming negative with respect to terminal 43 by an equal amount. The negative potential of terminal 41 is impressed on grids 14c and the positive potential of terminal 42 is impressed on grids 22c to cause rectifier 12 to be nonconductive and to cause rectifier 19 to be conductive to a predetermined extent. Rectifier 19 supplies a predetermined current to field winding 9d to maintain the voltage of armature 9a at the value required to maintain the speed of machine 6 at the desired value.

During the above described operation of the system, bias coils 51a, 52a are energized from battery 53 and control coils 51b, 52b are energized by a measure of the armature current of machine 6 through interpole winding 6c. Coils 51a, 51b, 52a, 52b are so wound that when generator 11 supplies current to machine 6, the magnetomotive forces of coils 51a, 51b act cumulatively with respect to each other and the magnetomotive forces of coils 52a, 52b act differentially with respect to each other, and that when the direction of current reverses in armature 6a and interpole 6c, coils 51a, 51b act differentially and coils 52a, 52b act cumulatively. The magnetomotive forces of bias coils 51a, 52a are adjusted so that for values of current in armature 6a below the predetermined limiting value, the magnetomotive force of the differentially acting bias coil exceeds the magnetomotive force of its associated control coil by an amount sufficient to render its associated diode nonconductive. Therefore, during the above described operation, if the current in armature 6a is below the limiting value, diodes 51, 52 are nonconductive and without effect on the regulating means.

If the speed of machine 6 increases above the desired value, the voltage of tachometer generator 46 increases to increase the voltage across divider 47 and render triode 36 more conductive. An increase in conductivity of triode 36 decreases the effective resistance of the triode to cause the positive potential of terminal 42 to decrease with respect to the potential of terminal 43. This decrease renders thyratrons 22 less conductive to supply a reduced current to field winding 9d, thereby reducing the voltage of armatures 9a and 11a to an extent sufficient to restore the speed of machine 6 to substantially the desired value. If the speed increases to a sufficient extent, triode 36 may cause bridge 28 to return to the balance point and become unbalanced in the other direction, rendering thyratrons 22 nonconductive and rendering thyratrons 14 conductive to supply current to field winding 9c to return the speed of machine 6 to the desired value. During such regulating action the voltage impressed between grid 36c and cathode 36b is affected by voltage drop in resistor 48, which voltage drop varies with the rate of change of the voltage of armature 11a, to prevent the speed of machine 6 from overshooting the desired value. The same action takes place if the speed setting is lowered by moving the adjustable tap of voltage divider 45.

A sequence of operations converse to that described above occurs when the speed of machine 6 decreases below the desired value or when the speed setting is raised by adjustment of the tap of voltage divider 45.

If, during acceleration of machine 6 the machine armature current tends to exceed the limiting value, the current in control coil 52b increases to an extent sufficient to reduce the net magnetomotive force acting on diode 52 below the value required to maintain diode 52 nonconductive. Diode 52 thereupon abruptly becomes conductive, decreasing the effective resistance of the bridge arm containing triode 36, to overcome the action of tachometer 46 and decrease the potential of point 42. Thyratrons 22 thereupon become less conductive to supply a reduced current to field winding 9d to reduce the voltage of generator 11 to prevent the current in armature 6a from substantially exceeding the predetermined limiting value.

When the speed setting of divider 45 is rapidly changed to reduce the speed of machine 6, or when it is desired to regeneratively brake machine 6 to a stop, the high inertia of rolls 7 and the associated equipment causes the voltage of machine 6 to exceed the voltage of machine 11, causing machine 6 to act as a generator supplying generator 11 as a motor, thereby reversing the direction of current flow in armature 6a. This reversal of current renders the actions of coils 51a, 51b differential with respect to each other, and if this reversed current tends to exceed the limiting value, diode 51 becomes abruptly conductive to reduce the impedance of the bridge arm containing resistor 32 and thereby render thyratrons 14 less conductive and thyratrons 22 more conductive, to increase the excitation of field winding 11b and the voltage of armature 11a to prevent current in machine 6 from substantially exceeding the limiting value.

Fig. 2 partly illustrates an alternate embodiment of the invention utilized in connection with the control of a machine in which the armature current does not reverse. In the embodiment of Fig. 2, only one magnetically controlled diode is required, this diode 51 being connected between bridge output terminal 41 and resistor 32. Diode 51 is provided with only one coil 51b, connected across interpole 6c as in the embodiment shown in Fig. 1. If the current supplied by generator 11 to armature 6a and interpole 6c remains below the predetermined critical value, the magnetomotive force of control coil 51b is insufficient to render diode 51 nonconductive, so that diode 51 is fully conductive and without appreciable effect on the bridge 28. However, if the current in armature 6a tends to exceed the critical value, the magnetomotive force of coil 51b becomes sufficient to render diode 51 nonconductive to increase the effective resistance of the bridge arm containing resistor 32. This action increases the potential of terminal 41 and decreases the potential of terminal 42, to reduce the current supplied by rectifier 19 to field winding 9d or to even render rectifier 19 nonconductive and render rectifier 12 conductive to supply current to field winding 9c, to prevent the current in armature 6a from substantially exceeding the critical value.

Although in the above described embodiments, it is assumed that bridge 28 is slightly unbalanced when machine 6 is operating at the desired value, it will be apparent that if resistor 9f is adjusted so that self exciting winding 9b provided all the excitation for exciter 9, bridge 28 could be balanced and rectifiers 12, 19 rendered nonconductive when machine 6 is operating at the desired speed.

Although but two embodiments of the present invention have been illustrated and described, it will be apparent to those skilled in the art that various changes and modifications may be made therein without departing from the spirit of invention or the scope of the appended claims. In particular, although the illustrated embodiment discloses the use of magnetically controlled diodes to limit the current in a dynamoelectric machine, it will be apparent that the diodes could be utilized to limit the speed, voltage or excitation of a dynamoelectric machine.

It is claimed and desired to secure by Letters Patent:

1. In a system for controlling an operating condition of a dynamoelectric machine, the combination of a source of current for supplying said machine, regulating means responsive to said operating condition for controlling the flow of current from said source to said machine, a diode connected to said regulating means, and magnetic control means for said diode responsive to another operating condition of said machine for overcoming said regulating means and for controlling the current supplied from said source to said machine to control said other operating condition.

2. In a system for maintaining an operating condition of a dynamoelectric machine substantially constant at a predetermined value, the combination of a source of current for supplying said machine, regulating means responsive to variations in said operating condition from predetermined value for controlling the flow of current from said source to said machine to maintain said condition substantially constant, a diode connected to said regulating means, and magnetic control means for said diode responsive to another operating condition of said machine attaining a predetermined limiting value for overcoming said regulating means to cause said source to supply current to said machine to prevent said other operating condition from substantially exceeding said limiting value.

3. In a system for maintaining an operating condition of a dynamoelectric machine substantially constant at a predetermined value, the combination of a source of current for supplying said machine, regulating means responsive to variations in said operating condition from said predetermined value for controlling the flow of current from said source to said machine to maintain said condition substantially constant, a diode connected to said regulating means, means including a magnetic bias coil for rendering said diode nonconductive, and a magnetic control coil opposing said bias coil energized by a measure of another operating condition of said machine, whereby said diode is rendered abruptly conductive upon said other operating condition attaining a predetermined limiting value for overcoming said regulating means and for controlling the current supplied from said source to said motor to prevent said other operating condition from substantially exceeding said limiting value.

4. In a system for maintaining the speed of a direct current motor substantially constant at a predetermined value, the combination of a source of current for supplying said motor, regulating means responsive to the speed of said motor for controlling the flow of current from said source to said motor to maintain the speed of said motor substantially constant at said predetermined value, means for reversing the direction of current flow in said motor, and magnetically controlled limiting means connected with said regulating means responsive to the current in said motor reaching a predetermined maximum value in either direction of flow for overcoming said regulating means to prevent the current in said motor from substantially exceeding said maximum value.

5. In a system for maintaining the speed of an electric motor substantially constant at a predetermined value, the combination of a generator for supplying current to said motor, a pair of differentially acting field windings for controlling the voltage of said generator, a source of current, means connecting said source with said field windings, means comprising a bridge circuit having a pair of output terminals for controlling the values of currents supplied from said source to said field windings, regulating means responsive to the speed of said motor connected with an element of said bridge circuit to produce across said output terminals a control voltage having a polarity and magnitude dependent upon the direction and magnitude of variations in said speed from said predetermined value to cause said field windings to be selectively energized to return said speed to said predetermined value, a diode connected across an element of said bridge circuit, and magnetic control means responsive to the current in said motor attaining a predetermined maximum value for rendering said diode abruptly conductive to overcome said regulating means and to control the energization of said field windings to prevent said current from substantially exceeding said predetermined maximum value.

6. In a system for maintaining the speed of a direct current motor substantially constant, the combination of a generator for supplying current to said motor, a pair of differentially acting field windings for controlling the voltage of said generator, a source of current, means connecting said source with said field windings, means comprising a bridge circuit having a pair of output terminals for controlling the current supplied from said source to said field windings, regulating means responsive to the speed of said motor connected with an element of said bridge circuit to cause selective energization of said field windings in response to variations in said speed from said predetermined value, means for reversing the direction of current flow in said motor, a first diode connected across an element of said bridge circuit, a second diode connected across another element of said bridge circuit, means including a first magnetic bias coil for rendering said first diode nonconductive, a first magnetic control coil opposing said first bias coil responsive to said motor current attaining a predetermined maximum value of one polarity for rendering said first diode abruptly conductive for overcoming said regulating means and for controlling the current supplied to said field windings to prevent said motor current from substantially exceeding said predetermined maximum value of said one polarity, means including a second magnetic bias coil for rendering said second diode nonconductive, and a second magnetic control coil opposing said second bias coil responsive to said motor current attaining a predetermined maximum value of the other polarity for rendering said second diode abruptly conductive for overcoming said regulating means and for controlling the current supplied to said field windings to prevent said motor current from substantially exceeding said predetermined maximum value of said other polarity.

7. In a system for maintaining the speed of an electric motor substantially constant, the combination of a generator for supplying current to said motor, a pair of differentially acting field windings for controlling the voltage of said generator, a source of current, means connecting said source with said field windings, means comprising a bridge circuit for controlling the current supplied from said source to said field windings, regulating means responsive to the speed of said motor connected with an element of said bridge circuit to cause selective energization of said field windings in response to variations in said speed from said predetermined value, a diode connected across an element of said bridge circuit, a magnetic bias coil for rendering said diode nonconductive, and a magnetic control coil opposing said bias coil responsive to said motor current attaining a predetermined maximum value for rendering said diode abruptly conductive for overcoming said regulating means and for controlling the current supplied to said field windings to prevent said motor current from substantially exceeding said predetermined maximum value.

ALLAN C. HALTER.

REFERENCES CITED

The following references are of record in the file of this patent:

UNITED STATES PATENTS

| Number | Name | Date |
|---|---|---|
| 2,352,231 | Stratton | June 27, 1944 |